United States Patent [19]

Hosoo et al.

[11] Patent Number: 4,769,293

[45] Date of Patent: Sep. 6, 1988

[54] MAGNETIC RECORDING MEDIUM AND PRODUCTION THEREOF

[75] Inventors: Shigeyuki Hosoo, Ibaraki; Takeshi Matsuura, Kyoto; Masatoshi Terazawa, Takatsuki; Takeshi Shibata, Kyoto, all of Japan

[73] Assignee: Hitachi Maxell, Ltd., Osaka, Japan

[21] Appl. No.: 56,991

[22] Filed: Jun. 3, 1987

[30] Foreign Application Priority Data

Jun. 4, 1987 [JP] Japan .................. 62-130559

[51] Int. Cl.$^4$ .............................................. G11B 5/70
[52] U.S. Cl. ..................... 428/694; 252/62.51; 252/62.54; 423/607; 428/402; 428/900
[58] Field of Search ............. 428/323, 694, 900; 427/128; 252/62.51, 62.54; 423/53, 607

[56] References Cited

U.S. PATENT DOCUMENTS

| | | |
|---|---|---|
| 3,512,930 | 5/1970 | Bottjer et al. ............... 427/128 |
| 3,529,930 | 9/1970 | Bottjer et al. ............... 423/607 |
| 3,811,942 | 5/1974 | Rennolds ............... 252/62.51 C |
| 4,495,246 | 1/1985 | Steck et al. ............... 428/694 |
| 4,659,627 | 4/1987 | Chung et al. ............... 428/694 |
| 4,670,177 | 6/1987 | Ohlinger et al. ............. 252/62.51 C |

*Primary Examiner*—Paul J. Thibodeau
*Attorney, Agent, or Firm*—Birch, Stewart, Kolasch & Birch

[57] ABSTRACT

A magnetic recording medium comprising a non-magnetic substrate and a magnetic layer formed thereon which contains chromium oxide ferromagnetic powder comprising chromium oxide of the formula:

$$CrO_x$$

wherein x is not smaller than 1.74 and not larger than 1.91, which has improved long term storage stability.

11 Claims, 1 Drawing Sheet

MAGNETIC RECORDING MEDIUM AND PRODUCTION THEREOF

BACKGROUND OF THE INVENTION

1. Field of the Invention

The present invention relates to a magnetic recording medium and production thereof. More particularly, it relates to a magnetic recording medium comprising a magnetic layer containing chromium oxide, which has improved long term storage stability.

2. Description of the Prior Art

It is well known that chromium dioxide ($CrO_2$) powder has a ferromagnetic property and is used as a magnetic powder of a magnetic recording medium. Chromium dioxide powder is commercially produced by oxidation of $Cr_2O_3$ and $CrO_3$ according to following reactions:

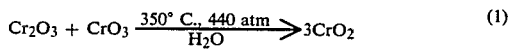

(1)

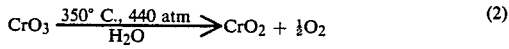

(2)

Coercive force and/or particle size of the chromium dioxide powder can be adjusted by the addition of $Sb_2O_3$, $Fe_2O_3$, $TeO_2$, $RhO_2$, $IrO_2$ or the like to produce magnetic powder for magnetic recording. Recently, the amount of the chromium dioxide powder consumed as the magnetic powder has been slightly decreasing since a magnetic powder comprising iron oxide or iron oxide covered with cobalt has been developed.

This is because chromium dioxide contains Cr(IV) which is chemically unstable so that it is inevitable that the saturation magnetization of the chromium dioxide inherently deteriorates in the air with the passage of time.

However, the chromium dioxide powder has an excellent property such that when recorded information is written over, namely when the recorded information of the magnetic recording medium is erased for re-recording the information is satisfactorily erased. Since this good overwriting property of the chromium dioxide powder is suitable for a magnetic recording medium for use as the external memory of a computer, which should have good repeated recording properties, the chromium dioxide powder is being reevaluated.

Under these circumstances, some attempts have been made to suppress the deterioration of the saturation magnetization with the passage of time due to chemical instability of chromium dioxide while maintaining the inherent advantages of chromium dioxide.

The first attempt is to convert the surface layer of the chromium dioxide powder particle from dioxide to hydroxide of Cr(III) which is more stable than chromium dioxide and comprises treating the chromium dioxide powder with a reducing agent, such as sodium sulfite (cf. Italian Pat. No. 27333A/79 and U.S. Pat. Nos. 3,512,930 and 3,529,930).

The second attempt is to remove reactive materials such as adsorbed water present on the surface of the chromium dioxide powder particles and comprises heating the chromium dioxide powder at a temperature of 330° to 370° C. in a nitrogen atmosphere (cf. G. Bassile, Material Review Bulletin, 17, (1982) 1197).

However, the above attempts cannot prevent deterioration of the saturation magnetization of the chromium dioxide powder with the passage of time, and a saturation magnetic flux density of a magnetic recording medium comprising such modified or thermally treated chromium dioxide powder decreases by 10 to 30% from the original value after the recording medium is kept standing in the air at 60° C. for 4 weeks.

This may be partly because the particle size of the chromium dioxide powder is made smaller to satisfy the requirements for high density recording and in turn its specific surface area increases so that reactivity of the particle surfaces increases and thereby the saturation magnetization more easily deteriorates than with the conventional chromium dioxide powder having a larger particle size, and partly because mutual reactivity between a binder and the chromium dioxide powder is increased by functional groups of an additive which is added to increase dispersibility of the chromium dioxide powder in the binder.

According to the study of the present inventors to find a good technique to prevent the deterioration of the saturation magnetization of the chromium dioxide powder with the passage of time, it was concluded that, by the above first attempt, although CrOOH is formed on the surface of the chromium dioxide powder particle, it may deteriorate the chemical stability of the chromium dioxide powder. Namely, according to the first attempt, even when CrOOH is formed on the surface of the chromium dioxide powder particle, it easily attracts water because of its hydrophilicity. This results in insufficient stability of the chromium dioxide powder.

By the above second attempt, the chromium dioxide powder is heated at a temperature of from 330° to 370° C. in an atmosphere of inert gas, such as nitrogen, to remove crystallization water of chromium dioxide or adsorbed water on the particle surface in order to increase the stability of chromium dioxide. However, the result is not satisfactory. This is because not only CrOOH but also chromium dioxide has strong bonding force with a reactive material such as water.

SUMMARY OF THE INVENTION

One object of the present invention is to provide novel chromium oxide ferromagnetic powder.

Another object of the present invention is to provide a magnetic recording medium having good overwriting properties and improved stability so that its magnetic properties are less deteriorated after long term storage.

A further object of the present invention is to provide a method for preventing deterioration of magnetic powder comprising chromium oxide by simple thermal treatment.

Yet, another object of the present invention is to provide a method for producing a magnetic recording medium having good overwriting properties and magnetic stability.

DETAILED DESCRIPTION OF THE INVENTION

In view of the above described circumstances, in accordance the present inventors have with the present invention replaced a part of chromium dioxide with a more stable chromium (III) oxide, since the chromium dioxide powder inherently readily bonds with water and the like and its properties will deteriorate. To achieve this, reaction conditions have been carefully selected while keeping in mind that oxides of chromium other than chromium (IV) are easily formed, since chromium dioxide is of course being an oxide of chromium, and that the formed chromium oxides should be stably present and not disappear.

As a result, it has been found that a desirable result can be obtained when the chromium dioxide powder is heated at a temperature not lower than 410° C. until saturation magnetization decreases to 46 to 87% of that of the untreated chromium dioxide ($\sigma_s$:86.3 emu/g).

Therefore, according to one aspect of the present invention, there is provided chromium oxide ferromagnetic powder comprising chromium oxide of the formula:

$$CrO_x$$

wherein x is not smaller than 1.74 and not larger than 1.91 ($1.74 \leq x \leq 1.91$).

According to another aspect of the present invention, there is provided a magnetic recording medium comprising a non-magnetic substrate and at least one magnetic layer formed thereon which contains the chromium oxide ferromagnetic powder of the present invention.

Figure 1:
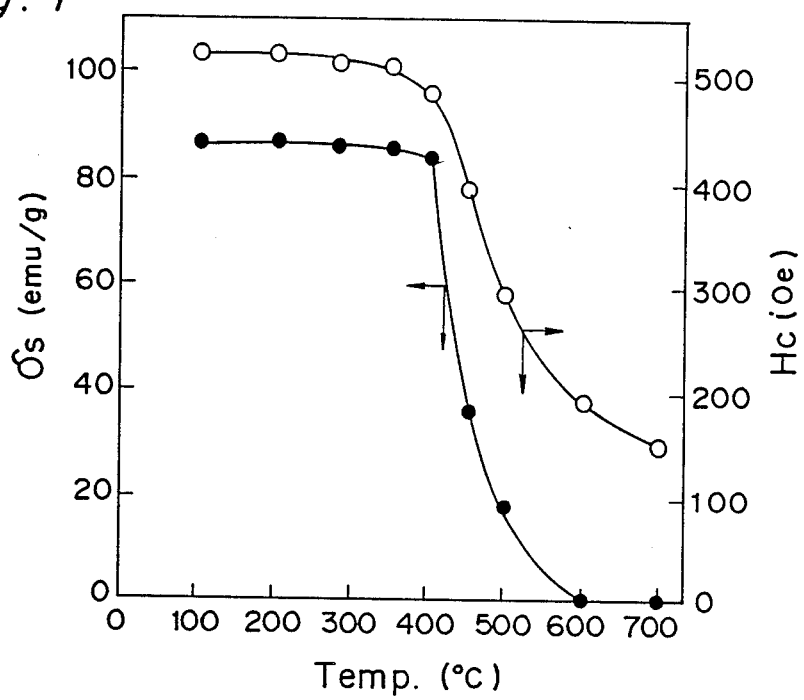
FIG. 1 shows changes of saturation magnetization (black circles) and coercive force (white circles) when the chromium dioxide powder having saturation magnetization of 86.3 emu/g and coercive force of 516 Oe is heated in the air for one hour at various temperatures.

FIG. 1 shows changes of saturation magnetization $\sigma_s$ (black circles) and coercive force Hc (white circles) when the chromium dioxide powder having saturation magnetization of 86.3 emu/g and coercive force of 516 Oe is heated in the air for one hour at various temperatures. From these results of FIG. 1, it is seen that saturation magnetization and coercive force due to magnetism of the chromium dioxide powder are not deteriorated when the powder is heated at a temperature lower than 400° C.

Figure 2:
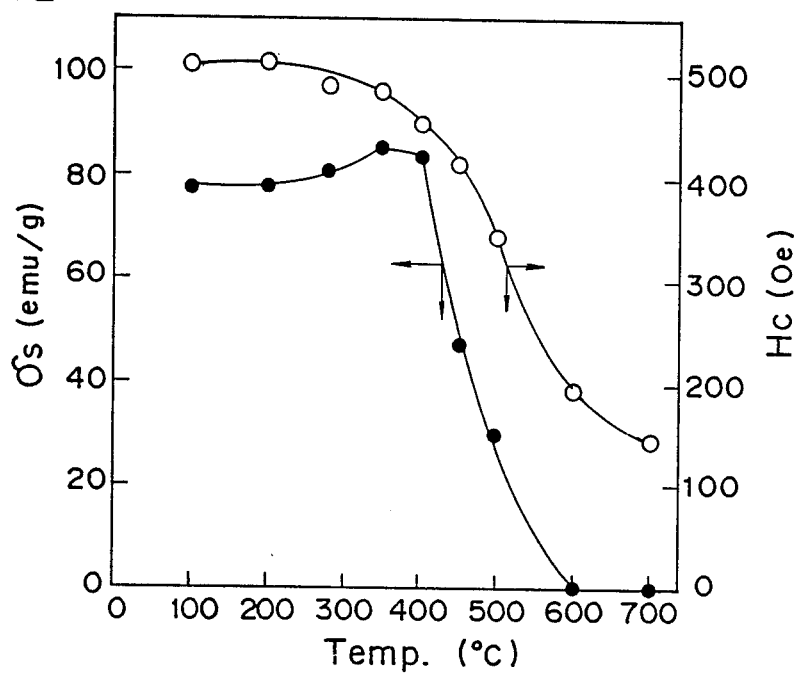
FIG. 2 shows changes of saturation magnetization (black circles) and coercive force (white circles) when magnetic powder having a saturation magnetization of 77.4 emu/g and coercive force of 505 Hc, which is produced by hydroxidising the surfaces of the chromium dioxide powder particles and supposed to have CrOOH on the surfaces, is heated in the air for one hour at various temperatures.

FIG. 2 shows changes of saturation magnetization (black circles) and coercive force (white circles) when magnetic powder having saturation magnetization of 77.4 emu/g and coercive force of 505 Hc, which is produced by hydroxidising the surfaces of the chromium dioxide powder particles and supposed to have CrOOH on the surfaces, is heated in the air for one hour at various temperatures. From the fact that saturation magnetization of the magnetic powder increases in a temperature range lower than 400° C. and decreases in a temperature range higher than 400° C., it can be said that when the magnetic powder is heated at a temperature higher than 410° C., CrOOH is reconverted to $CrO_2$ and substantially no CrOOH is present on the surfaces of the chromium dioxide powder particles.

According to the invention, therefore, the reason for heating the chromium dioxide powder at a temperature of not lower than 410° C. is to remove CrOOH and to produce desired chromium oxide.

The gradual conversion from $CrO_2$ to a non-magnetic material comprising $Cr_2O_3$ (Cr(III) oxide) by heating at a temperature not lower than 410° C. can be traced by measuring decrease of saturation magnetization or weight change. While the theoretical weight decrease is 9.5% when all the chromium dioxide powder is converted to $Cr_2O_3$, the weight loss found in the completely nonmagnetized powder is about 9% for the raw material chromium dioxide powder of the present invention. This means that the thermally treated magnetic powder according to the present invention comprises a major amount of chromium (III) oxide and a slight amount of chromium (IV) oxide. An average valency of chromium in the oxide is closer to trivalency than to tetravalency and x in $CrO_x$ falls in the range from 1.71 to 1.91.

In this connection, U.S. Pat. No. 3,512,930 discloses an intermediate chromium oxide of Cr(IV) and Cr(III) of the formula:

$$Cr_yO_z$$

wherein a ratio of z/y (=x) is not smaller than 2.0 and not larger than 3.0. However, such intermediate chromium oxide does not have sufficient effect on improvement of stability of chromium dioxide.

On the contrary, the magnetic recording medium utilizing the chromium oxide ferromagnetic powder treated according to the present invention shows excellent stability. That is, when the chromium oxide ferromagnetic powder according to the present invention is kept standing in the air at 60° C. for 4 weeks, a deterioration ratio of saturation magnetization does not exceed 6%.

It is easily recognized by the conventional gravimetric method that the atomic composition of the extremely stabilized chromium oxide ferromagnetic powder according to the present invention is such that the atomic ratio of chromium and oxygen, namely x in the formula: $CrO_x$ is not smaller than 1.74 and not larger than 1.91, and that preferably the weight ratio of chromium(IV) oxide to a total weight of chromium (IV) oxide and other chromium oxides is at least 48% by weight. Further, by a sample vibration type magnetometer, the chromium oxide according to the present invention is analyzed to have saturation magnetization of 40 to 75 emu/g.

For effectively producing the chromium oxide according to the present invention, the chromium dioxide powder containing substantially no CrOOH is heated at a temperature not lower than 410° C. till saturation magnetization decreases to 46 to 87% of original saturation magnetization of untreated chromium dioxide powder ($\sigma s = 86.3$ emu/g) to produce $CrO_x$ wherein x is as defined above.

When the chromium dioxide powder contains CrOOH, it may be heated at a temperature of 250° to 400° C. in a nonreducing atmosphere to reconvert CrOOH to chromium dioxide and then heated at a higher temperature as described in the above, or the chromium dioxide powder containing CrOOH as such may be heated at a higher temperature as described in the above.

The thermally treated ferromagnetic powder of the present invention is used as such or coated with a conventional organic material, and then dispersed in a synthetic resin base binder together with an organic solvent to prepare a magnetic paint, which is coated on a non-magnetic substrate made of, for example, a synthetic resin film or a non-magnetic metal plate and dried to produce a stabilized magnetic recording medium of the present invention.

As described in the above, the chromium dioxide powder should be heated at a temperature not lower than 410° C. In view of uniformity and efficiency of the thermal treatment, preferably the chromium dioxide powder is heated at a temperature of 410° to 600° C., more preferably 420° to 500° C. The heating atmosphere should not be such atmosphere which prohibits the formation of $CrO_x$ wherein x is as defined in the above. Preferably, the heating is carried out in the air or a non-reducing atmosphere. The heating time is usually 0.2 to 6 hours.

The ferromagnetic chromium oxide powder according to the present invention has improved affinity with a highly reactive resin having various polar groups and/or functional groups.

Preferred Embodiments

The present invention will be explained further in detail by following examples in which parts are by weight unless otherwise indicated.

EXAMPLE 1

Each of following ferromagnetic chromium oxide powder (1,500 g) was heated in a muffle furnace of 50 cm in length, 30 cm in width and 30 cm in depth at a temperature of Table 1 and for a period of time of Table 1 in the air under 1 atm.

Ferromagnetic Chromium Oxide Powder (a) Ferromagnetic chromium dioxide powder
Major axis: 0.4 μm
Axis ratio: 10
Specific surface area: 25 m²/g
Saturation magnetization: 86.3 emu/g
Coercive force: 516 Oe
Deterioration ratio: 29%
(after kept standing at 60° C. in the air for 4 weeks)

(b) Ferromagnetic chromium oxide powder particle surfaces of which were converted to the hydroxide of chromium (III) according to U.S. Pat. No. 3,512,930
Major axis: 0.4 μm
Axis ratio: 10
Specific surface area: 25 m²/g
Saturation magnetization: 77.4 emu/g
Coercive force: 505 OE
Deterioration ratio: 24%
(after kept standing at 60° C. in the air for 4 weeks)

TABLE 1

| Sample No. | Ferromagnetic powder | Temp. (°C.) | Heating time (hrs) |
| --- | --- | --- | --- |
| 1 | a | 350 | 1 |
| 2 | a | 390 | 1 |
| 3 | a | 420 | 2.5 |
| 4 | a | 420 | 4 |
| 5 | a | 410 | 6 |
| 6 | a | 500 | 0.5 |
| 7 | b | 350 | 1 |
| 8 | b | 390 | 1 |
| 9 | b | 410 | .1 |
| 10 | b | 420 | 1 |
| 11 | b | Not heated | |
| 12 | b | Not heated | |

Properties of each sample ferromagnetic powder are shown in Table 2.

TABLE 2

| Sample No. | x in $CrO_x$ | $\sigma_s$ (emu/g) | Hc (Oe) | Deterioration ratio (%) | Ratio of Cr(IV)/non-Cr(IV) |
| --- | --- | --- | --- | --- | --- |
| 1 | 2.0 | 86 | 495 | 14.1 | 1/0 |
| 2 | 2.0 | 86 | 470 | 11.0 | 1/0 |
| 3 | 1.86 | 65 | 460 | 2.5 | 0.72/0.28 |
| 4 | 1.80 | 53 | 446 | 2.0 | 0.60/0.40 |
| 5 | 1.87 | 67 | 460 | 2.9 | 0.74/0.26 |
| 6 | 1.91 | 76 | 440 | 3.0 | 0.82/0.18 |
| 7 | 2.0 | 86 | 483 | 14.5 | 1/0 |
| 8 | 2.0 | 86 | 450 | 12.0 | 1/0 |
| 9 | 1.91 | 76 | 445 | 4.5 | 0.82/0.18 |
| 10 | 1.89 | 71 | 437 | 3.0 | 0.77/0.23 |
| 11 | 2.0 | 86 | 510 | 29.0 | 1/0 |
| 12 | — | 72 | 507 | 24.5 | — |

Each ferromagnetic chromium oxide powder having the above properties (100 parts) was mixed with vinyl chloride/vinyl acetate/vinyl alcohol copolymer (VAGH manufactured by U.C.C.) (9 parts), polyurethane resin (Estan 5701 manufactured by Goodrich) (8 parts), myristic acid (1 part), n-butyl stearate (0.5 part), carbon black (2 parts), cyclohexanone (144 parts) and toluene (144 parts) and dispersed in a ball mill for 75 hours. Thereafter, polyisocyanate compound (Colonate L manufactured by Nippon Urethane) (3 parts) was added and thoroughly mixed to prepare a magnetic paint. Then, the magnetic paint was coated on a substrate made of a polyester film having a thickness of 20 μm with a gravure coater to a thickness of 4 μm after drying and planished. The film with the magnetic coating was cut to produce a magnetic tape, which was assigned the same number as that of the sample of the ferromagnetic powder.

TABLE 3

| Tape No. | Residual magnetic flux density Br (G) | Squareness ratio Br/Bs | Coercive force (Oe) | Deterioration ratio (%) |
| --- | --- | --- | --- | --- |
| 1 | 1,760 | 0.80 | 500 | 12.0 |
| 2 | 1,720 | 0.81 | 485 | 11.7 |
| 3 | 1,510 | 0.82 | 465 | 5.5 |
| 4 | 1,480 | 0.79 | 450 | 4.6 |
| 5 | 1,605 | 0.80 | 460 | 4.0 |
| 6 | 1,650 | 0.81 | 440 | 3.0 |
| 7 | 1,710 | 0.80 | 470 | 10.9 |
| 8 | 1,700 | 0.79 | 450 | 10.1 |
| 9 | 1,635 | 0.80 | 440 | 4.9 |
| 10 | 1,610 | 0.81 | 435 | 4.2 |
| 11 | 1,770 | 0.81 | 505 | 16.3 |
| 12 | 1,780 | 0.81 | 500 | 14.0 |

Properties of the ferromagnetic powder and the magnetic tape shown in Tables 2 and 3 were measured as follows:

Deterioration ratio

Deterioration ratios of the ferromagnetic powder and the magnetic tape are calculated from the original saturation magnetization and residual magnetic flux density and those measured after the ferromagnetic powder and the magnetic tape are kept standing in the air at 60° C. for 4 weeks.

Atomic ratio x ($CrO_x$)

The atomic ratio x is calculated from the weight of $CrO_x$ and saturation magnetization, and the weight of the sample after heating it till saturation magnetization becomes 0 (zero) with assuming that only $CrO_2$ component has magnetism.

Cr(IV)/non-Cr(IV) ratio

This ratio is calculated from the weight change of the sample caused by the thermal treatment carried out in measuring the atomic ratio x.

Saturation magnetization, Coercive force and Saturated magnetic flux density

These properties are measured with a sample vibration type magnetometer (VSM-3 manufactured by Toei Kogyo) by applying a magnetic field of 5kOe.

As understood from the above results, the ferromagnetic powder samples and the magnetic tapes of the present invention (Nos. 3, 4, 5, 6, 9 and 10) suffer from less deterioration than the conventional ones.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A chromium oxide ferromagnetic powder comprising chromium oxide of the formula:

$$CrO_x$$

wherein x is not smaller than 1.74 and not larger than 1.91.

2. The chromium oxide ferromagnetic powder according to claim 1, which has saturation magnetization of 40 to 75 emu/g.

3. The chromium oxide ferromagnetic powder according to claim 1, which contains at least 48 atomic % of Cr(IV) based on the total of Cr(IV) and Cr other than Cr(IV).

4. The chromium oxide ferromagnetic powder according to claim 1, the deterioration ratio of saturation magnetization of which after kept standing in the air at 60° C. for 4 weeks is not more than 6%.

5. A magnetic recording medium comprising a non-magnetic substrate and a magnetic layer formed thereon which contains chromium oxide ferromagnetic powder comprising chromium oxide of the formula:

$$CrO_x$$

wherein x is not smaller than 1.74 and not larger than 1.91.

6. The magnetic recording medium according to claim 5, wherein the chromium oxide ferromagnetic powder has saturation magnetization of 40 to 75 emu/g.

7. The magnetic recording medium according to claim 5, wherein the chromium oxide ferromagnetic powder contains at least 48 atomic % of Cr(IV) based on the total of Cr(IV) and Cr other than Cr(IV).

8. The magnetic recording medium according to claim 5, wherein the deterioration ratio of saturation magnetization of the chromium oxide ferromagnetic powder after kept standing in the air at 60° C. for 4 weeks is not more than 6%.

9. A process for producing a magnetic recording medium which comprises steps of heating chromium dioxide powder containing substantially no CrOOH at a temperature not lower than 410° C. till saturation magnetization decreases to 46 to 87% of original saturation magnetization of untreated chromium dioxide powder, preparing a magnetic paint containing the thermally treated chromium oxide ferromagnetic powder in the previous step, coating the magnetic paint on a non-magnetic substrate and drying it.

10. The process according to claim 9, wherein the chromium dioxide ferromagnetic powder is heated at a temperature of 410° to 600° C.

11. The process according to claim 9, wherein the chromium dioxide ferromagnetic powder is heated in a non-reducing atmosphere.

* * * * *

UNITED STATES PATENT AND TRADEMARK OFFICE
CERTIFICATE OF CORRECTION

PATENT NO.   : 4,769,293
DATED        : September 6, 1988
INVENTOR(S)  : Hosoo et al It is certified that error appears in the above-identified patent and that said Letters Patent is hereby corrected as shown below:

Please change the Foreign Application Priority Data from "Jun. 4, 1987 [JP] Japan . . . . . 62-130559" to --Jun. 4, 1986 [JP] Japan . . . . . . 61-130559--

Signed and Sealed this

Twenty-fourth Day of October, 1989

Attest:

DONALD J. QUIGG

*Attesting Officer*  *Commissioner of Patents and Trademarks*